H. SPRINZEL.
COMBINED FAN AND SUNSHADE.
APPLICATION FILED APR. 29, 1909.
946,078.
Patented Jan. 11, 1910.
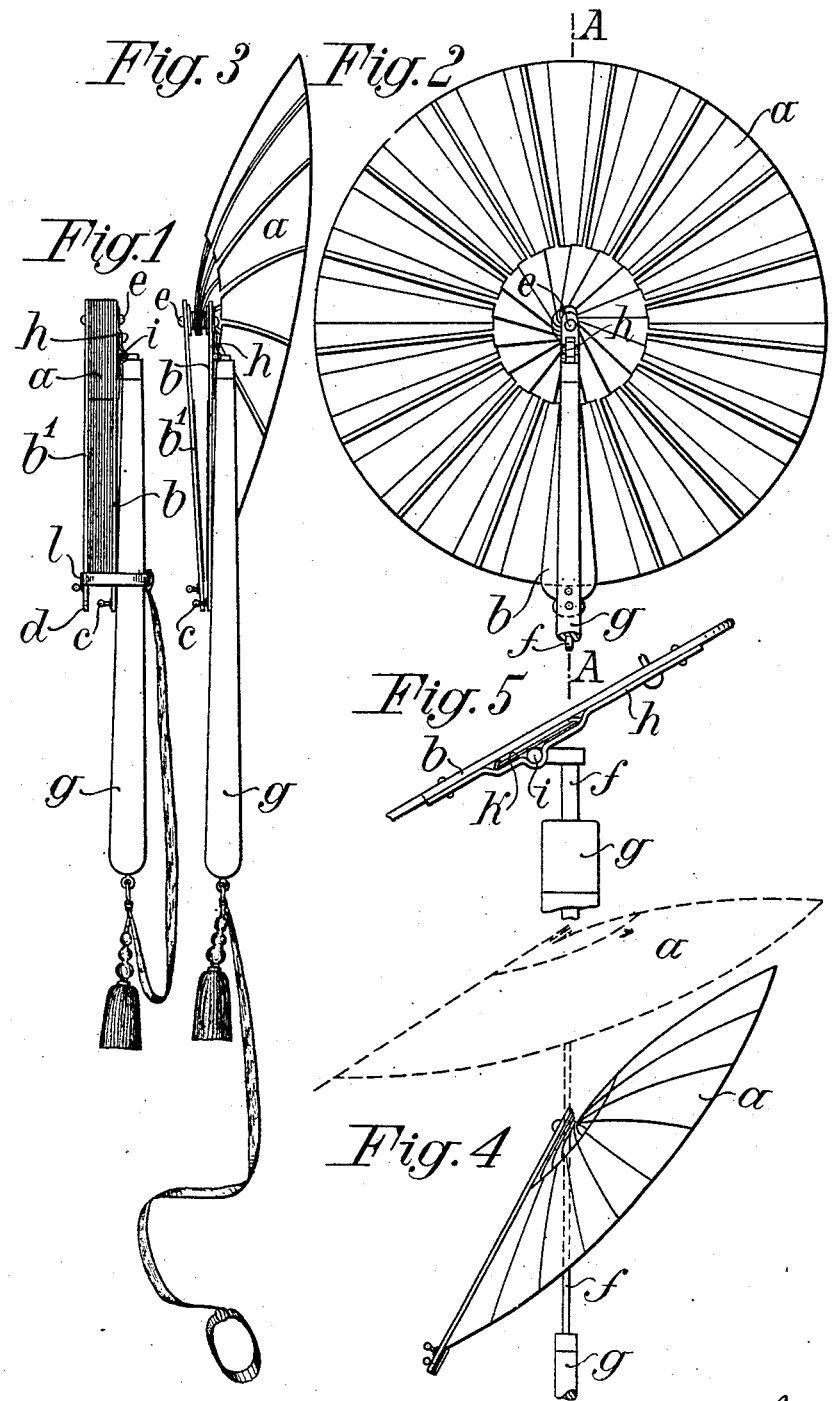

UNITED STATES PATENT OFFICE.

HERMANN SPRINZEL, OF VIENNA, AUSTRIA-HUNGARY, ASSIGNOR TO FRANZ SEIBOLD AND THE FIRM OF BRÜDER GRUNBAUM, OF VIENNA, AUSTRIA-HUNGARY.

COMBINED FAN AND SUNSHADE.

946,078.  Specification of Letters Patent.  Patented Jan. 11, 1910.

Application filed April 29, 1909. Serial No. 492,841.

*To all whom it may concern:*

Be it known that I, HERMANN SPRINZEL, subject of the Emperor of Austria-Hungary, residing at Vienna, Austria-Hungary, have invented certain new and useful Improvements in Combined Fans and Sunshades, of which the following is a specification.

This invention relates to a lady's fan having its blades arranged in a circle and which, if desired, can be used also as a sunshade.

The accompanying drawing illustrates one form of the fan according to the present invention, Figure 1 showing the fan in its closed position, Fig. 2 showing the open fan in the position when it is used as a fan. Fig. 3 is a section on the line A—A, in Fig. 2. Fig. 4 is a side view of different positions of the fan when it is used as sunshade, Fig. 5 shows a detail.

The fan $a$ as shown is a circular fan, the outside blades $b\ b'$ of which are provided with a suitable closing device, for instance a button $c$ and eye $d$ in order to keep it opened in a stretched condition. One of the two blades $b$ is articulated near the pivot $e$ of the fan blades to the extreme end of a rod $f$ by means of the pivot member $h$, the said rod $f$ being so arranged as to be capable of telescoping within the handle $g$. The pivot pins $i$ can be maintained in any position by means of a flat spring $k$ that bears against the same and is arranged so that, when the fan is opened, any desired position with reference to the handle $g$ and the rod $f$ can be imparted to the same (see Fig. 4).

When the fan is opened and fixed in a position parallel to the handle it can be used as a fan (see Figs. 2 and 3).

In order to use the fan as a sunshade the rod $f$ is more or less pulled out of the handle $g$ and the body of the fan is tilted into any desired inclined position, as shown in Fig. 4.

When not in use the fan may be kept close to the handle by means of a ring $l$ attached to the handle by a ribbon or the like (see Fig. 1).

I claim:

1. A combined fan and sun-shade, comprising a handle, a circular fan, a pivot piece attached to one of the outside blades of said fan and pivotally connecting it with said handle and a spring bearing against the pivots of said pivot piece, so as to hold said fan when opened in any desired position.

2. A combined fan and sun-shade, comprising a handle, a rod adapted to telescope therein, a circular fan, a pivot piece attached to one of the outside blades of said fan and pivotally connecting it with said rod and a spring bearing against the pivots of said pivot piece, so as to hold said fan when opened in any desired position.

In testimony whereof I have hereunto set my hand in presence of two subscribing witnesses.

HERMANN SPRINZEL.

Witnesses:
 JOSEF RUBRERCH,
 AUGUST FUGGER.